United States Patent
Schuchnigg

(10) Patent No.: US 11,807,328 B2
(45) Date of Patent: Nov. 7, 2023

(54) BICYCLE SEATPOST

(71) Applicant: Canyon Bicycles GmbH, Koblenz (DE)

(72) Inventor: Lukas Schuchnigg, Koblenz (DE)

(73) Assignee: Canyon Bicycles GmbH, Koblenz (DE)

( * ) Notice: Subject to any disclaimer, the term of this patent is extended or adjusted under 35 U.S.C. 154(b) by 355 days.

(21) Appl. No.: 17/004,165

(22) Filed: Aug. 27, 2020

(65) Prior Publication Data

US 2021/0061385 A1 Mar. 4, 2021

(30) Foreign Application Priority Data

Aug. 28, 2019 (DE) ...................... 20 2019 104 713.5

(51) Int. Cl.
*B62J 1/02* (2006.01)
*B62J 1/08* (2006.01)
*B62K 19/36* (2006.01)

(52) U.S. Cl.
CPC . *B62J 1/02* (2013.01); *B62J 1/08* (2013.01); *B62K 19/36* (2013.01)

(58) Field of Classification Search
CPC .............. B62J 1/02; B62J 1/08; B62K 19/36
See application file for complete search history.

(56) References Cited

U.S. PATENT DOCUMENTS

| | | | | |
|---|---|---|---|---|
| 5,829,733 A | * | 11/1998 | Becker | B62K 19/36 248/404 |
| 6,364,292 B1 | * | 4/2002 | Chen | B62J 1/02 297/195.1 |
| 2004/0007847 A1 | | 1/2004 | Sinyard et al. | |
| 2004/0239159 A1 | * | 12/2004 | Muscat | B62J 1/007 297/215.15 |
| 2005/0248118 A1 | * | 11/2005 | D'Aluisio | B62J 1/02 280/275 |
| 2008/0298886 A1 | * | 12/2008 | Chen | B62K 19/36 280/288.4 |
| 2011/0248469 A1 | | 10/2011 | Chubbuck et al. | |
| 2013/0228668 A1 | * | 9/2013 | D'Aluisio | B62J 1/08 248/629 |
| 2015/0217824 A1 | * | 8/2015 | Liao | B62J 1/02 297/214 |
| 2016/0244114 A1 | * | 8/2016 | D'Aluisio | B62J 1/02 |

FOREIGN PATENT DOCUMENTS

| | | |
|---|---|---|
| DE | 60309188 T2 | 8/2007 |
| DE | 202007014551 U1 | 4/2009 |
| EP | 3321154 A1 | 5/2018 |
| WO | 2004007269 A1 | 1/2004 |

* cited by examiner

*Primary Examiner* — Tony H Winner
(74) *Attorney, Agent, or Firm* — The Webb Law Firm

(57) ABSTRACT

For improving damping properties and aerodynamics of a bicycle seatpost, said bicycle seatpost substantially includes three elements. A support element includes a connecting member for connecting to a bicycle saddle, and a holding member for fixing to a seat tube. Said two members are connected to each other by a bending member. At the front side of the bending member, a damping element is adhered, in particular with its entire surface. The damping element is particularly partially surrounded by a shell-shaped form element.

22 Claims, 4 Drawing Sheets

BICYCLE SEATPOST

CROSS-REFERENCE TO RELATED APPLICATION

This application claims priority to Germany Patent Application No. 20 2019 104 713.5 filed Aug. 28, 2019, the disclosure of which is hereby incorporated by reference in its entirety.

BACKGROUND OF THE INVENTION

Field of the Invention

The disclosure relates to a bicycle seatpost, in particular for racing bicycles, wherein racing bicycle also include special embodiments such as triathlon bicycles, time trial bicycles and the like.

Description of Related Art

Conventional seatposts are fixed in the seat tube of a bicycle frame by a clamp. For this purpose, the seat tube comprises in the upper end area a longitudinal slit and is surrounded by the clamp. For fixing the bicycle seatpost in the seat tube, it is further known to provide a wedge-like element instead of a saddle clamp inside the seat tube, wherein the wedge-like element is pressed by means of a clamping screw against the seatpost. Thus, the seatpost is clampingly fixed inside the seat tube.

Particularly for racing bicycles the basic requirement for the bicycle seatpost is that on the one hand the greatest possible comfort and on the other hand good aerodynamic properties are to be achieved. These requirements are somewhat contradictory since a good damping property can be achieved, for example, by a seatpost with a flat transverse profile, for example a transverse oval profile, however, such a seatpost is unfavorable in terms of aerodynamics.

An object of the disclosure is to provide a bicycle seatpost having good damping properties with good aerodynamic properties.

The object is achieved by a bicycle seatpost having the features of this disclosure.

SUMMARY OF THE INVENTION

The bicycle seatpost according to the disclosure, particularly suitable for racing bicycles, comprises a support element. The support element comprises a connecting member which is provided in a mounted state at the upper end. The connecting member serves for connecting the support element with a bicycle saddle, wherein the connection is usually achieved through a saddle support. The support element further comprises a holding member. In a mounted state, the holding member preferably protrudes completely into the seat tube and is thus arranged in a mounted state particularly in the lower end of the support element. The holding member serves for fixing the support element inside the seat tube of a bicycle frame, wherein the fixation is achieved through an additional clamping element. Furthermore, the support element comprises a bending member. The bending member is arranged between the connecting member and the holding member, wherein the bending member is particularly flexibly designed. The bicycle seatpost according to the disclosure further comprises a damping element connected with the support element. The damping element damps occurring shocks or the like, so that these shocks are not completely transferred to the cyclist. In addition, the damping element is at least partially surrounded by a shaped element. The shaped element ensures if the damping element is deformed, it cannot or can only partially evade by changing its shape. Thus, energy is destroyed, whereby a damping can be achieved.

In a particularly preferred embodiment, the damping element is connected to the bending member, particularly at a front side of the bending member. The front side of the bending member is the side of the bending member facing in a mounted state in the direction of travel. Here, it is particularly preferred that the damping element is connected with the bending element across the entire surface. It is further preferred that the damping element extends across 50%, in particular at least across 70%, and particularly preferably at least across 90% of the bending member. In a particularly preferred embodiment, the damping element extends across a substantial part of the length of the bending member. Optionally, the damping element can also protrude into the area of the connecting member and/or the holding member.

It is further preferred that the width of the damping element has at least 80% and particularly at least 90% of the width of the bending member transversely to the direction of travel.

With the above-described, particularly preferred embodiment of the damping element, in conjunction with the bending member, good damping properties can be achieved. If the bending member is elastically deformed, the damping element is also deformed. Due to the at least partial casing of the damping element by the shaped element, the damping element cannot evade but is particularly compressed. Thus, a damping occurs.

In a particularly preferred further development of the disclosure, the damping element comprises a soft plastic, in particular polyurethane and is particularly preferably made thereof. The material of the damping element particularly has a Shore hardness of 30 A to 85 A.

In a preferred further development, the shaped element is shell-shaped in order to surround the damping element at least at its free external sides in a preferably extensive manner. Here, it is preferred that the damping element is connected with the shaped element at an inside of the shaped element. The damping element particularly rests with its entire surface on the inside of the shaped element. It is particularly preferred that the connection between the damping element and the shaped element is also achieved, for example by adhering.

In its cross-section, the shaped element is particularly U-shaped, so that the shaped element surrounds, in particular in the mounted state, the two side surfaces as well as the front side of the damping element. Thus, if the damping element deforms, an evasion of the damping element is substantially avoided. Particularly due to the U-shaped design a front side with very good aerodynamic properties can be realized.

In a particularly preferred further development of the disclosure, a space, in particular a gap, is formed between the shaped element and the bending member. Regardless of the provision of a gap, the shaped element is preferably only connected via the damping element with the support element, in particular with the bending member. There is preferably no direct connection between the shaped element and the support element, in particular the bending member. In this respect, there is also no direct force transmission here, so that all forces and torques are transferred via the damping element and in this respect good damping properties can be realized.

In a further preferred embodiment, the shaped element is configured such that is more elastic in the bending direction, e.g. in particular in the direction of travel, than transversely to the bending direction. In this respect, a structural set-up is preferred where the support element is configured to be wider transversely to the direction of travel or the longitudinal direction of the frame than in the longitudinal direction of the frame. The bending member, and particularly the entire support element, is preferably designed as a hollow profile.

In a particularly preferred embodiment, the bending member and the holding member are offset to one another. The bending member and the holding member are preferably offset parallel to one another. In the mounted state, the holding member is arranged in the direction of travel preferably in front of the bending member. It is particularly preferred that the support element has a substantially S-shaped design in side view.

BRIEF DESCRIPTION OF THE DRAWINGS

In the following, the disclosure is described in more detail by means of a preferred embodiment with reference to the accompanying drawings, in which.

DESCRIPTION OF THE INVENTION

Figure 2:
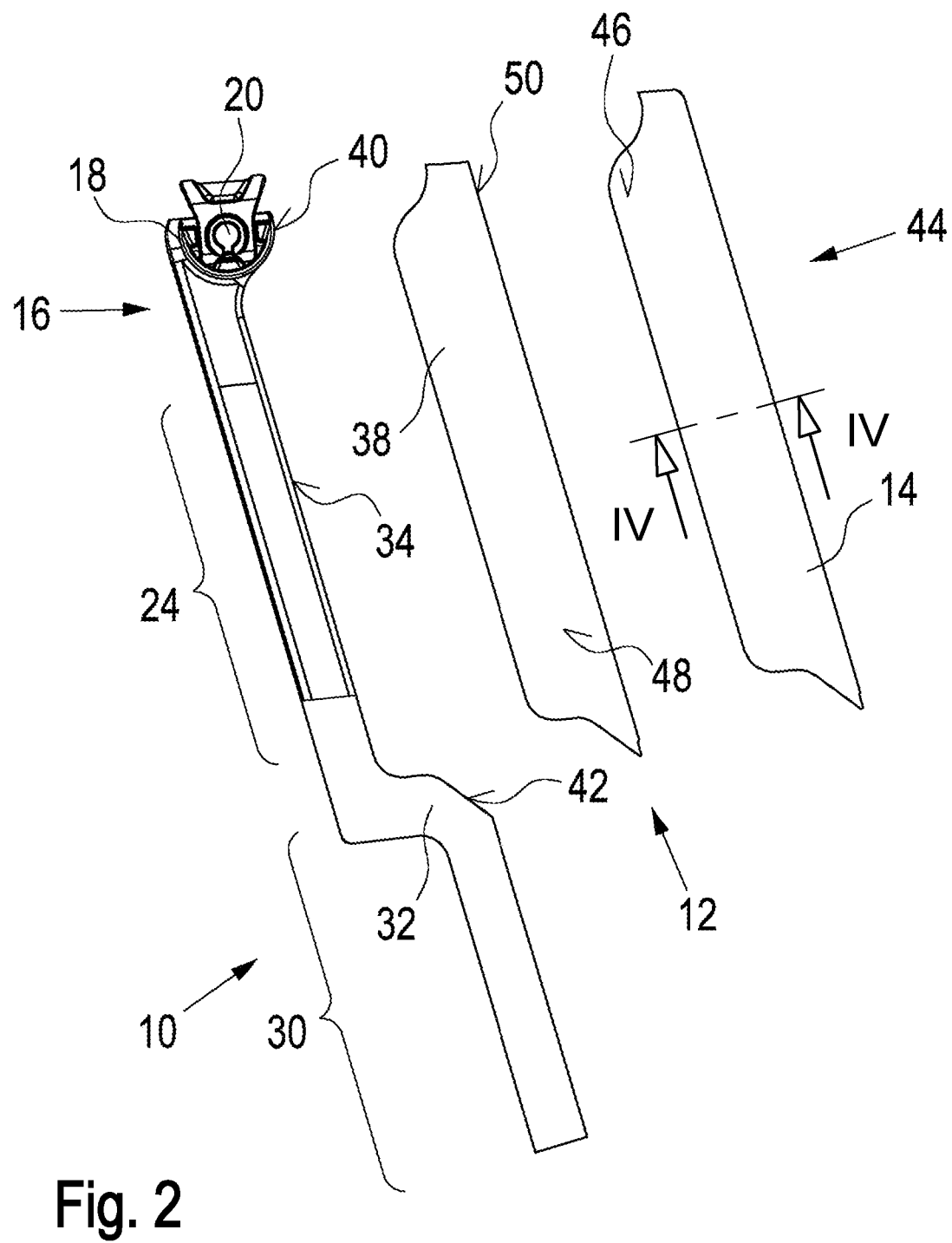
FIG. 2 shows a schematic perspective exploded view of the bicycle seatpost.

The bicycle seatpost substantially comprises three components (FIG. 2). An S-shaped support element 10, a damping element 12 and a shaped element 14.

The support element comprises at its upper end 16 in the mounted state a connecting member 18. In the illustrated exemplary embodiment, said connecting member comprises a circular opening 20 in which a holding member 22 for connection with a bicycle saddle is provided. In this case, the connection to the bicycle saddle can be achieved indirectly through a saddle support.

Figure 3:
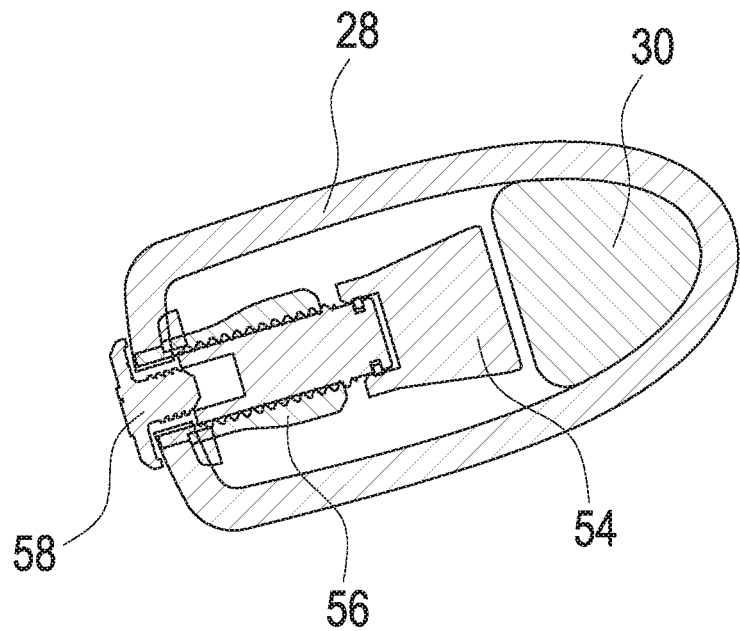
FIG. 3 shows a schematic sectional view through the saddle tube along the line in FIG. 1.
Figure 4:
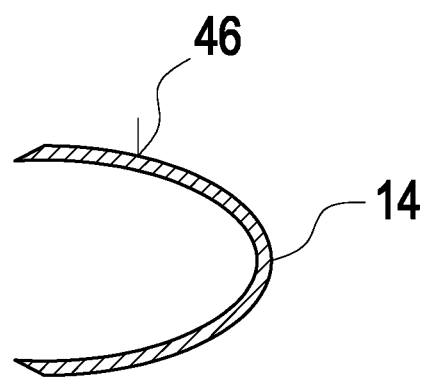
FIG. 4 shows a schematic sectional view through the shaped element along the line IV-IV in FIG. 2.

The bending member 24 is adjacent to connecting member 10. Said bending member is rod-shaped and extends in the mounted state substantially in longitudinal direction 26 of a saddle tube 28. The holding member 30 is connecting to bending member 24. In the mounted state, holding member 30 is arranged within seat tube 28 (FIG. 2). Due to the offset between bending member 24 and holding member 30, which is particularly parallel, an intermediate member 32 is provided in the illustrated exemplary embodiment, wherein intermediate member 32 can also be part of bending member 24. The holding member 30 extends substantially in longitudinal direction 26 of saddle tube 28 in the mounted state. The fixation of holding member 30 inside saddle tube 28 is achieved by a clamping (FIG. 3).

At a front side 34 of bending part 24, i.e. at the side of bending member 24 facing in the mounted state in the direction of travel 36, damping element 12 is arranged. For this purpose, a rear side 38 of damping element 12 facing towards front side 34 is connected particularly with its entire surface with front side 34, in particular by adhering. In the illustrated exemplary embodiment, the design of damping element 12 is such that it also rests in an upper area against an external side 40 of connecting element 16 and against an external side 42 of intermediate member 32 and that it is also connected in this area with its entire surface, in particular by adhering.

The shaped element 14 has a hollow cross-section and its cross-section has a U-shaped design. The shaped element 14 can thus be inserted in FIG. 3 in the direction of an arrow 44 over damping element 12. Preferably the entire U-shaped inside 46 of shaped element 14 is connected with the external sides 48 opposite to each other and front side 50 of damping element 12.

Figure 1:
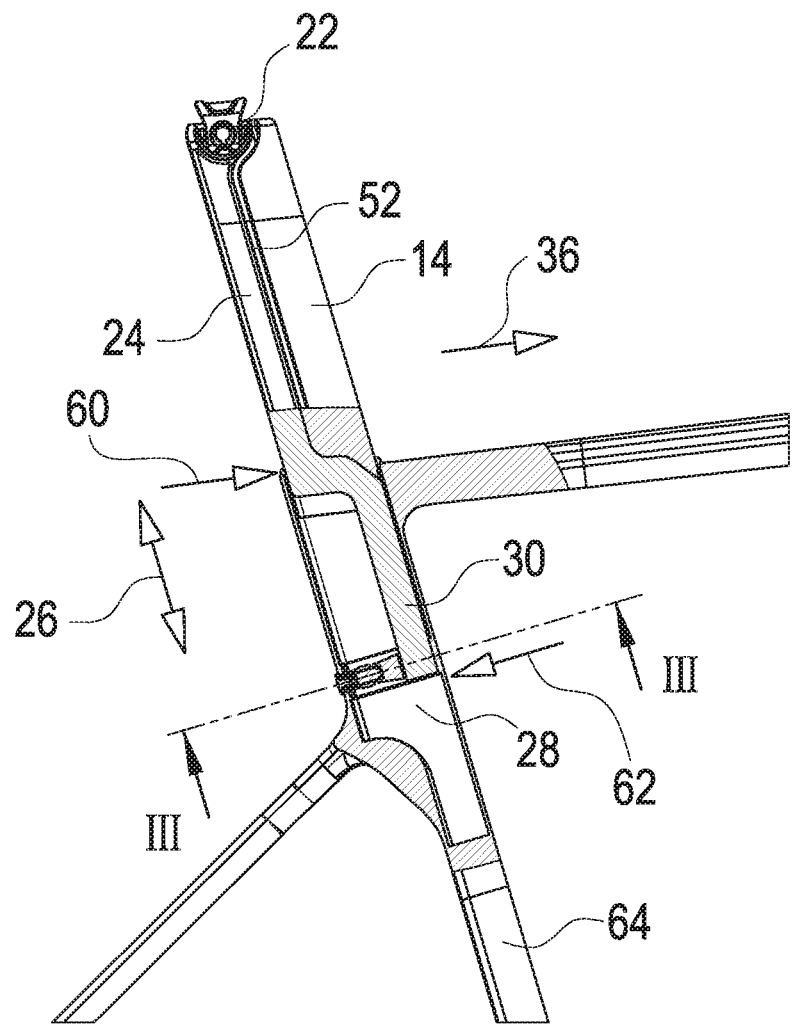
FIG. 1 shows a schematic side view of a mounted bicycle seatpost, wherein the saddle tube is illustrated in sectional view for clarification.

In the mounted state (FIGS. 1 and 2), a gap 52 is provided between shaped element 14 and bending member 24. The gap 52 extends on both sides across the entire length of shaped element 14. Thus, it is ensured that if bending member 24 deforms, shaped element 14 does not get into contact with bending member 24, so that the force and torque transmission always only takes place through damping element 12. The deformation of damping element 12 is suppressed by the shell-shaped shaped element, so that the damping element is compressed or stretched. This leads to a destruction of energy and thus a damping.

The bicycle seatpost according to the disclosure is configured such that support element 10 is connected with damping element 12 and the shell-shaped shaped element 48. In this configuration, the bicycle seatpost can be mounted easily by being inserted from above into seating tube 28 and by being fixed through the clamping.

A clamping (FIG. 3) is provided for fixing the bicycle seatpost. Inside saddle tube 28, holding member 30 is arranged which does not fill the cross-section of saddle tube 28. A clamping element 54 is then arranged inside saddle tube 28 for clamping. Said clamping element presses holding element 30 against the inside of saddle tube 28. For this purpose, a screw 58 is provided in a threaded sleeve 56.

Regardless of the above-described particularly preferred embodiment of the disclosure, the in side view S-shaped design of the bicycle seatpost has the advantage that two contact and stress points occur on the frame. An upper stress point is at the upper frame end 60 and a lower stress point is at the lower end 62 of the saddle support. In the illustrated exemplary embodiment, the clamping is carried out in this area. A further advantage of the in side view S-shaped design of the seatpost is that an area 64 of saddle tube 28, which is arranged at the level of the rear wheel, can be narrower in the area of the rear wheel in the direction of travel 36. This results in a greater tire clearance. Furthermore, an advantage of the configuration according to the disclosure is that the clamping (FIG. 3) can be arranged completely inside saddle tube 28.

The invention claimed is:

1. A bicycle seatpost comprising:
    a support element comprising a connecting member for connecting with a bicycle saddle, a holding member for fixing inside a seat tube of a bicycle frame, and a bending member arranged between the connecting member and the holding member,
    a damping element connected with the support element, and
    a shaped element at least partially enclosing the damping element,
    wherein the shaped element comprises a U-shaped cross-section.

2. The bicycle seatpost according to claim 1, wherein the damping element is connected with the bending member.

3. The bicycle seatpost according to claim 1, wherein an entire inner surface of the damping element is connected with the bending member.

4. The bicycle seatpost according to claim 1, wherein the damping element extends across at least 50% of the bending member.

5. The bicycle seatpost according to claim 1, wherein a width of the damping element is at least 80% of a width of the bending member transversely to a direction of travel.

6. The bicycle seatpost according to claim 1, wherein the damping element comprises a soft plastic.

7. The bicycle seatpost according to claim 1, wherein the shaped element is shell-shaped.

8. The bicycle seatpost according to claim 1, wherein the damping element rests against an inside of the shaped element.

9. The bicycle seatpost according to claim 1, wherein the bending member and the holding member are offset to one another.

10. The bicycle seatpost according to claim 1, wherein between the shaped element and the bending member a space is provided.

11. The bicycle seatpost according to claim 1, wherein the shaped element is connected to the bending member only through the damping element.

12. The bicycle seatpost according to claim 1, wherein the shaped element is configured such that it is more elastic in a bending direction than transversely to the bending direction.

13. A bicycle seatpost comprising:
   a support element comprising a connecting member for connecting with a bicycle saddle, a holding member for fixing inside a seat tube of a bicycle frame, and a bending member arranged between the connecting member and the holding member,
   a damping element connected with the support element, and
   a shaped element at least partially enclosing the damping element,
   wherein the bending member is designed as a hollow profile.

14. The bicycle seatpost according to claim 13, wherein the damping element is connected with the bending member.

15. The bicycle seatpost according to claim 13, wherein an entire inner surface of the damping element is connected with the bending member.

16. The bicycle seatpost according to claim 13, wherein the damping element extends across at least 50% of the bending member.

17. The bicycle seatpost according to claim 13, wherein the shaped element is connected to the bending member only through the damping element.

18. A bicycle seatpost comprising:
   a support element comprising a connecting member for connecting with a bicycle saddle, a holding member for fixing inside a seat tube of a bicycle frame, and a bending member arranged between the connecting member and the holding member,
   a damping element connected with the support element, and
   a shaped element at least partially enclosing the damping element,
   wherein the support element has a S-shaped design in a side view.

19. The bicycle seatpost according to claim 18, wherein the damping element is connected with the bending member.

20. The bicycle seatpost according to claim 18, wherein an entire inner surface of the damping element is connected with the bending member.

21. The bicycle seatpost according to claim 18, wherein the damping element extends across at least 50% of the bending member.

22. The bicycle seatpost according to claim 18, wherein the shaped element is connected to the bending member only through the damping element.

* * * * *